US008086853B2

(12) United States Patent
Warwick

(10) Patent No.: US 8,086,853 B2
(45) Date of Patent: Dec. 27, 2011

(54) AUTOMATIC CENTRALIZED AUTHENTICATION CHALLENGE RESPONSE GENERATION

(75) Inventor: Alan M. Warwick, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1130 days.

(21) Appl. No.: 11/084,622

(22) Filed: Mar. 18, 2005

(65) Prior Publication Data
US 2006/0212701 A1 Sep. 21, 2006

(51) Int. Cl.
H04L 29/06 (2006.01)
H04L 9/32 (2006.01)
G06F 3/00 (2006.01)

(52) U.S. Cl. ............ 713/168; 713/155; 713/169; 710/8; 710/15

(58) Field of Classification Search .................. 713/168, 713/155, 169; 710/15, 8
See application file for complete search history.

(56) References Cited

U.S. PATENT DOCUMENTS

| 5,721,779 | A * | 2/1998 | Funk .............................. 713/155 |
| 6,487,667 | B1 * | 11/2002 | Brown .............................. 726/7 |
| 6,546,492 | B1 * | 4/2003 | Walker et al. ...................... 726/3 |
| 6,909,708 | B1 * | 6/2005 | Krishnaswamy et al. .... 370/352 |
| 6,925,297 | B2 * | 8/2005 | Wenzel .......................... 455/411 |
| 6,957,199 | B1 * | 10/2005 | Fisher .............................. 705/78 |
| 2002/0064149 | A1 * | 5/2002 | Elliott et al. .................. 370/352 |
| 2003/0005280 | A1 * | 1/2003 | Bobde et al. .................. 713/150 |
| 2003/0233546 | A1 * | 12/2003 | Blom .............................. 713/168 |
| 2004/0014422 | A1 * | 1/2004 | Kallio ............................ 455/41.1 |
| 2004/0039924 | A1 * | 2/2004 | Baldwin et al. ................. 713/189 |
| 2004/0157585 | A1 * | 8/2004 | Sashihara ....................... 455/411 |
| 2004/0179682 | A1 * | 9/2004 | Soliman ........................... 380/44 |
| 2005/0074126 | A1 * | 4/2005 | Stanko ........................... 380/279 |
| 2005/0081045 | A1 * | 4/2005 | Nicodemus et al. ........... 713/182 |
| 2005/0251681 | A1 * | 11/2005 | Robles et al. .................. 713/172 |
| 2006/0009197 | A1 * | 1/2006 | Chiba et al. .................... 455/411 |
| 2006/0087999 | A1 * | 4/2006 | Gustave et al. ................ 370/328 |
| 2006/0200670 | A1 * | 9/2006 | Kuffel et al. ................... 713/170 |
| 2006/0205388 | A1 * | 9/2006 | Semple et al. ................. 455/411 |
| 2008/0172730 | A1 * | 7/2008 | Sandhu et al. ..................... 726/9 |
| 2008/0189778 | A1 * | 8/2008 | Rowley ............................... 726/9 |
| 2008/0301445 | A1 * | 12/2008 | Vasic et al. .................... 713/171 |
| 2009/0287922 | A1 * | 11/2009 | Herwono et al. ............. 713/155 |
| 2010/0174907 | A1 * | 7/2010 | Semple et al. ................ 713/169 |

OTHER PUBLICATIONS

Tate, et al., "Introduction to Storage Area Networks," Mar. 2003, IBM Redbooks.*

* cited by examiner

*Primary Examiner* — Nathan Flynn
*Assistant Examiner* — Sarah Su

(57) ABSTRACT

A centralized challenge response verification server such as a RADIUS server is used to generate challenge responses as well as to verify challenge responses. In this way, the requirement for all machines to maintain a set of shared secrets corresponding to all potential peers is eliminated. In an embodiment of the invention, an authentication plug-in extends the RADIUS server to accept a challenge from an authenticatee and to generate a response to that challenge. The RADIUS server also acts to accept a challenge response and to verify that response. In an embodiment of the invention, a name service server maintains information regarding the network, and may also maintain an identification of network zones and storage profiles within which devices may intercommunicate or other network information.

19 Claims, 5 Drawing Sheets

US 8,086,853 B2

AUTOMATIC CENTRALIZED AUTHENTICATION CHALLENGE RESPONSE GENERATION

FIELD OF THE INVENTION

This invention pertains generally to computer networking and, more particularly, to centralized challenge response generation for authentication between networked machines.

BACKGROUND OF THE INVENTION

As the importance of computers and computing devices continues to increase in business, educational, and other environments, the need to store vast amounts of data has given rise to a type of network called a storage area network (SAN). A SAN is a specialized high-speed network especially adapted for interconnecting various types of data storage devices. Typically a SAN is used as a data storage pool for an enterprise or institution. Since large quantities of data may be stored on and retrieved from the SAN, it is typically located close to the point at which the data will be accessed, but aside for speed and simplicity, there is no reason why the SAN cannot be remote from the usage location. A number of SANs may also be interconnected in order to provide redundancy or increased storage capacity.

The data stored in a SAN may be confidential, proprietary, personal, commercially sensitive or otherwise in need of secure treatment. For this reason, pairs of machines in a SAN will typically authenticate each other prior to exchanging data. The Challenge Handshake Authentication Protocol (CHAP) is an example of a mechanism by which mutual authentication can be executed. CHAP is one of the Point-to-Point Protocol (PPP) suites of protocols. By way of background, for dialing into a network, such as for dial-in internet access or RAS, a CHAP packet is transported in the data field of a PPP data link layer frame. With SANs, PPP is not involved, but instead the CHAP exchange is transported over the storage transfer protocol. The CHAP protocol involves a periodic verification of peer identity through a three way handshake process. Typically the handshaking process is performed when a link is first established, but it may also be repeated periodically as needed.

In order for the CHAP protocol to be used in a SAN, each pair of devices is configured with a shared secret known only among the machines of the pair. When one device needs to authenticate the other device, the first device will send a challenge to the second device. The other device is required to then derive a response to the challenge using both the challenge and the shared secret, and then return the response to the first device. The first device will then compare the response with the expected response based on the shared secret. If the received response and the expected response match, then the other device is deemed by the first device to be authentic. Typically, the process is repeated by the second device with respect to the first device so that the devices are mutually authenticated.

As noted above, the challenge handshake mechanism requires a separate shared secret for each pair of devices. As such, the configuration of shared secrets can be difficult to manage on larger networks. The RADIUS protocol allows challenge responses to be validated at the RADIUS server rather than at the individual machines. However, each machine must still be configured with the appropriate shared secret since it must still generate challenge responses.

A SAN device authentication mechanism is needed whereby devices may securely authenticate one another without requiring each machine to be configured with shared secrets for all potential peers.

BRIEF SUMMARY OF THE INVENTION

In various embodiments of the invention, a centralized challenge response verification server such as a RADIUS server or the like is used to generate challenge responses as well as to verify challenge responses. In this way, the requirement for all machines to maintain a set of shared secrets corresponding to all potential peers is eliminated. In an embodiment of the invention, an authentication plug-in extends the RADIUS server to accept a challenge from an authenticatee and to generate a response to that challenge. The RADIUS server also acts to accept a challenge response and to verify that response. In an alternative embodiment of the invention, a standalone RADIUS server employs this functionality directly rather than via a plug-in.

In an embodiment of the invention, a name service server maintains information regarding the network, configuration information about the devices on the network and the capabilities and allowed operations between devices, and may also maintain an identification of network zones within which devices may intercommunicate or other network information. In other embodiments of the invention, a name service server is not utilized. Additional features and advantages of the invention will be apparent from the following detailed description of illustrative embodiments which proceeds with reference to the accompanying figures.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

Figure 1:
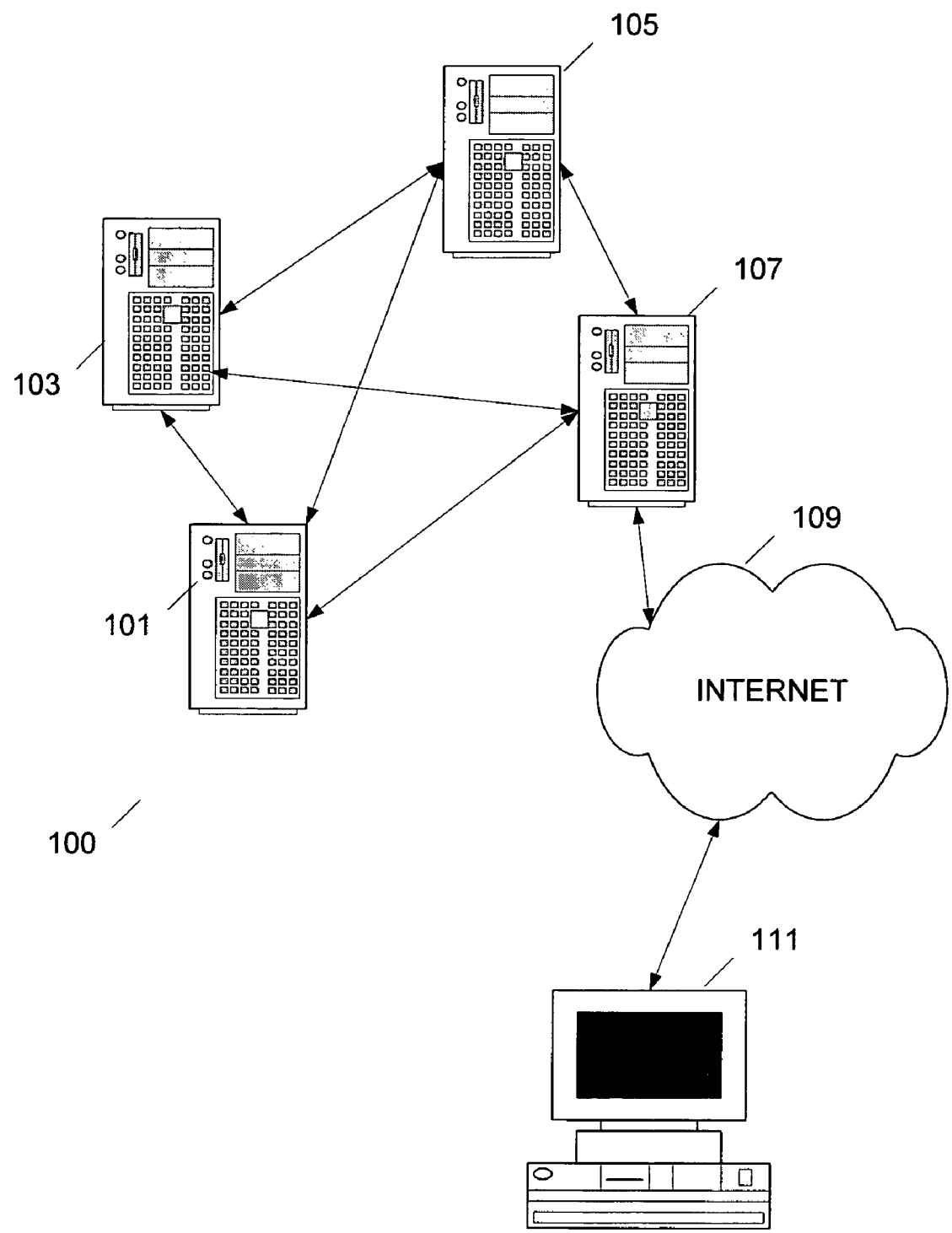
FIG. 1 is a schematic network diagram showing a network environment within which an embodiment of the invention may be implemented.
Figure 2:
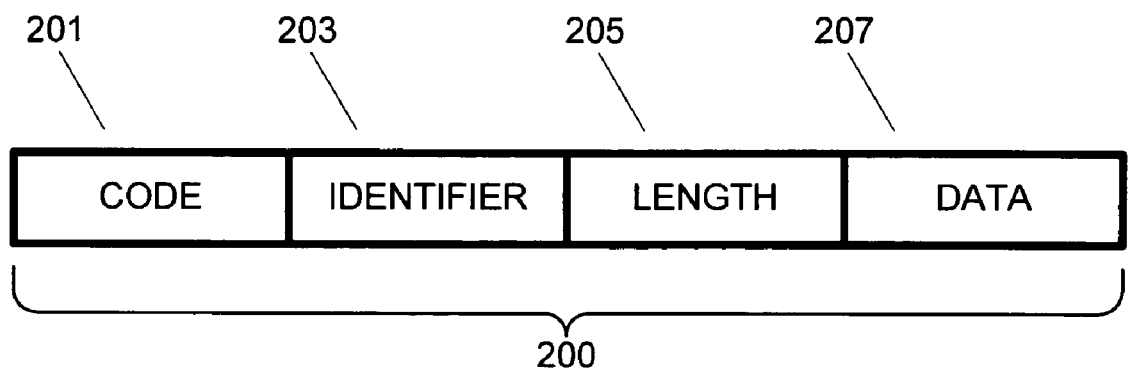
FIG. 2 is a packet structure diagram illustrating the packet structure of a packet 200 according to the CHAP protocol, in which the packet 200 has a code field 201, an identifier field 203, a length field 205, and a data field 207.

Methods and systems for improved mutual device authentication will now be described with respect to various embodiments. The skilled artisan will readily appreciate that the methods and systems described herein are merely exemplary and that variations can be made without departing from the spirit and scope of the invention.

In overview, a centralized challenge response verification server such as a RADIUS server or the like is used in an embodiment of the invention to generate challenge responses as well as to verify challenge responses. In this way, the requirement for all machines to maintain a set of shared secrets corresponding to all potential peers is eliminated. The present invention will be more completely understood through the following detailed description, which should be read in conjunction with the attached drawings. In this description, like numbers refer to similar elements within various embodiments of the present invention.

The invention is illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced in a variety of computer system configurations, including hand-held devices, multi-processor systems, and microprocessor-based or programmable consumer electronics devices. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

In order to fully understand the concept of a SAN, a brief discussion of the history of data storage may be helpful. Initially, data for client server systems was stored either on the server or in a device directly attached to the server. However, it was realized that this type of storage represented problems for scalability, efficiency and capacity. Thus, Network Attached Storage (NAS) was introduced. This technology migrated the storage devices from the server to the network itself. However, the NAS system still suffered from the drawback that it took bandwidth from the primary network for the exchange of data and so on. Thus, SANs evolved from the NAS system to allow storage devices to communicate directly with each other over their own separate network using fast media.

There are other more fundamental differences between NAS and SAN in terms of how the data on the remote storage is accessed. A computer connected to a NAS will access data on the NAS using a filename, e.g., \\server\share\filename.txt. A computer connected to a SAN would access the data on the SAN via the logical block number on the disk without regard to filenames. Thus a computer connected to a SAN disk would appear as just another "local" disk with a drive letter. Moreover, SANs may be composed of not just disks, but also tapes, changers, CD-ROMs or any other device that can expose a SCSI interface.

A SAN is any network of storage devices that are interconnected and also connected directly or indirectly to one or more servers. The server(s) allow access to the SAN for entities outside of the SAN. A fibre channel SAN typically employs specialized switches to interconnect the storage devices of the SAN. These interconnecting switches, which are similar to standard networking switches, serve to knit the storage devices of the SAN together over a distinct network. For an iSCSI SAN, the switches can be standard TCP/IP network switches. For either type, the ability of the SAN to transfer data over a separate network prevents the normal network infrastructure from becoming unusable or slow during the transfer of data.

Other benefits of consolidating storage in a SAN more generally include greater scalability of storage capacity, fewer back-up hard-drives to purchase and maintain, and increased performance and efficiency. Another advantage provided by a SAN is serverless backup, wherein a disk storage device transmits data directly to a backup device over the links of the SAN without involving a server.

The SAN fabric may be any of a number of types of well-known media, such as iSCSI. The fibre channel technology mentioned above is also increasingly being used to efficiently interconnect storage devices, allowing communication rates approaching 10 Gbps. A benefit of fibre channel over more traditional technologies such as SCSI is that fibre channel technology can be employed to span much greater distances, sometimes as much as six miles.

As discussed, embodiments of the invention are usable to improve the efficiency of communications in a SAN or other network wherein peer authentication is required. FIG. 1 is a simplified schematic view of a SAN network usable to implement various embodiments of the invention. As shown, the SAN 100 comprises a number of data servers including first 101, second 103, and third 105 servers. The data servers 101, 103, 105 are interconnected by a suitable network fabric such as iSCSI, fibre channel or otherwise. The data servers 101, 103, 105 are also connected by the fabric to another server such as web server 107 that acts as a portal or connection from the outside into the SAN. In the illustrated embodiment of the invention, the web server 107 is accessible via the Internet 109. In turn, a client computer 111 may access the web server 107 and hence the SAN 100 via the Internet.

Although this example configuration may be used in any number of ways, in one example the web server 107 comprises an enterprise server such as for an online retailer, and the client computer 111 is operated by a client of the online retailer. The SAN may be used in this example to store customer information and/or inventory information and/or product information.

As noted above, the data stored in SAN 100 is typically of a sensitive or valuable nature, and as such it is important to protect the data from unauthorized access. Thus, in a SAN, each storage device will often need to authenticate one of its peers and gain configuration information about that peer. When performed by each of a pair of machines, this process is referred to as mutual authentication. Mutual authentication may be accomplished via a challenge scheme such as that provided by CHAP (Challenge Handshake Authentication Protocol). The iSCSI and FC protocols allow for a number of in-band authentication mechanisms including CHAP. Proving that a device is indeed the device that it purports to be using the CHAP protocol relies upon the fact that the authenticator and authenticate share a secret or password.

In overview, the authenticator transmits a challenge string to the authenticatee. If the authenticatee has the appropriate shared secret, it is able to use the shared secret to derive a response to the challenge string, which it then transmits to the authenticator. If the authenticator also computes the same response, then the authenticatee is deemed to be authentic. Otherwise, the authenticatee is deemed to be not authentic, and access to the authenticator is disallowed.

The following discussion gives more detail regarding the CHAP protocol, although other mutual authentication systems requiring the generation of challenges and responses using a shared secret are also usable within embodiments of the invention.

CHAP is used as an authentication method for iSCSI devices to authenticate each other. The process of an iSCSI initiator logging into an iSCSI target is as follows. First the initiator initiates a TCP/IP connection to the target and begins the login sequence. The login sequence exchanges information about the iSCSI session being setup. As part of the login sequence is an authentication phase where the initiator will specify the authentication methods it can use and must specify CHAP as one of them. The target responds with the chosen authentication method (typically CHAP) and will send a challenge and a random string. The initiator is then required to take the challenge, the random string and the CHAP secret and create a hash value. The creation of a hash value uses a hashing algorithm such as MD5 which is designed to create a unique hash value for different inputs. The hash value is sent as the CHAP response to the target. The target computes the hash value in the same way that the initiator created the response and compares the hash value with the response. If they do not match, the target will disconnect the TCP/IP connection. If they do match, the target sends an acknowledgement that the initiator has authenticated itself. The initiator is then free to send its own challenge to authenticate the target. The initiator's challenge works in the same way as described above except in reverse.

DH CHAP is used to authenticate FC nodes that connect to switches and targets. The DH_CHAP exchange works over the fibre channel protocols in a way analogous to CHAP over iSCSI protocol.

Figure 3:
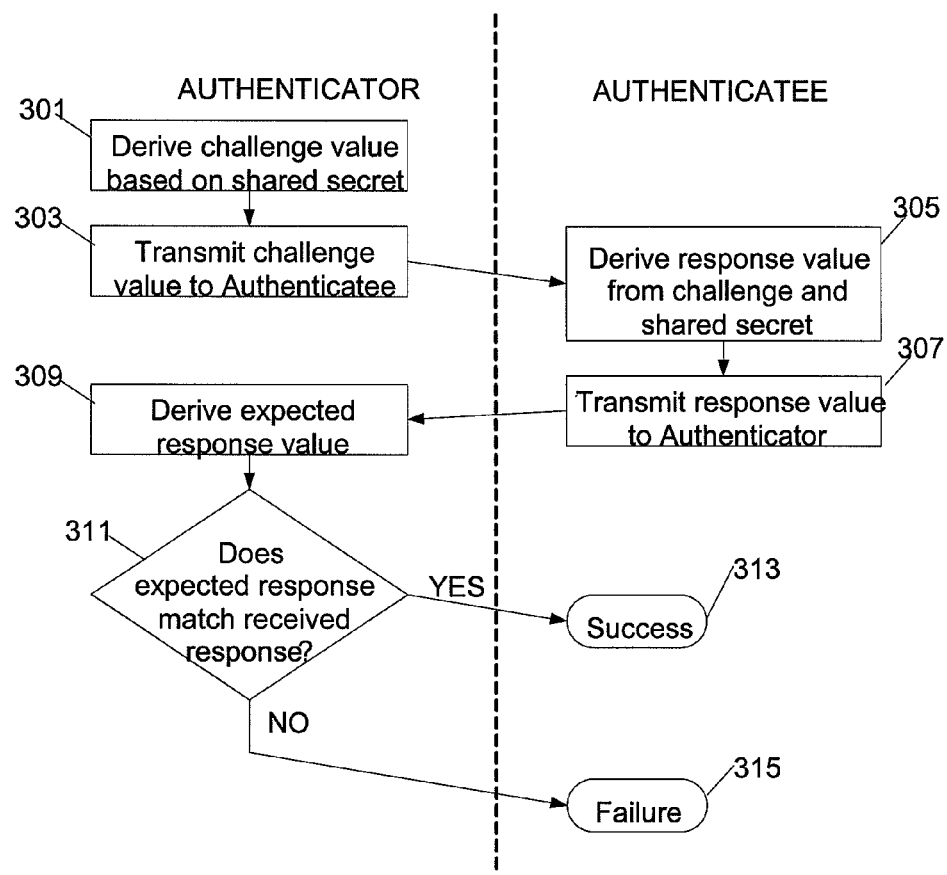
FIG. 3 is a process flow diagram illustrating a portion of a mutual authentication operation using the ordinary CHAP steps.

FIG. 3 illustrates the communications and processes involved in one half of the mutual authentication of peers (i.e., one peer authenticating the other peer). At step 301, the authenticator randomly derives a challenge value. In step 303, the authenticator transmits the challenge value in a CHAP challenge packet to the authenticatee. The authenticatee processes the challenge value using the shared secret to create a response value in step 305, and transmits the response value to the authenticator in step 307 via a CHAP response packet.

Having received the response value in step 307, at step 309 the authenticator independently derives an expected response. At step 311, the authenticator compares the received response to the expected response. If the received response to the expected response, the authenticator transmits a CHAP success packet to the authenticatee in step 313, whereupon authentication of the authenticatee is successful. Otherwise, the authenticator transmits a CHAP failure packet to the authenticatee in step 315, whereupon authentication of the authenticatee is not successful.

As can be seen from the above discussion, traditional mutual authentication requires that each machine maintain a list of shared secrets, one for each peer. The frequent required checking of responses based on the shared secrets was a burden and resulted in the development of centralized response verification servers, i.e. RADIUS servers. The RADIUS protocol allows the verification of responses at the RADIUS server instead of requiring the authenticator to verify received responses. In particular, RADIUS supports PPP, PAP, CHAP and is used to provide authentication, authorization, and accounting services. Radius uses UDP and compares passwords/names to those held in a database.

Referring to FIG. 3, the RADIUS server would essentially execute steps 309 and 311 for the authenticator, saving it time and resources. However, it will be appreciated that even with the use of a RADIUS server, each machine still has to maintain the list of shared secrets, which is resource and time intensive, especially for larger networks, in order to generate appropriate challenge responses. In an embodiment of the invention, an extension of the RADIUS protocol further reduces the authentication burden on the network machines by allowing the RADIUS server to generate Responses as well as to verify responses.

Figure 4:
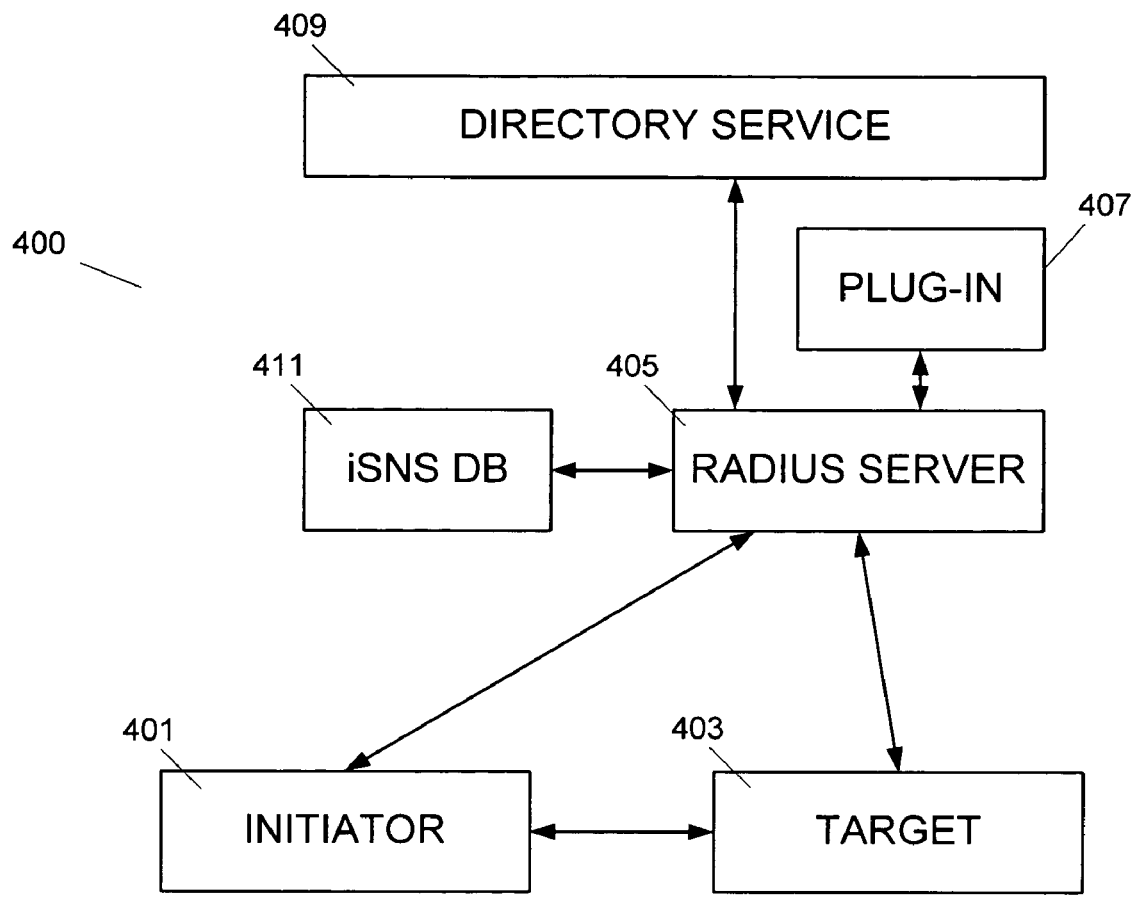
FIG. 4 is a schematic architecture of an authentication environment according to an embodiment of the invention.

FIG. 4 illustrates an architecture according to an embodiment of the invention for allowing mutual authentication between devices. The architecture 400 includes an Initiator 401 and a Target 403 device. During mutual authentication, each device will act as both an authenticator and an authenticatee. The Initiator 401 is typically the device that begins the connection process. The devices 401, 403 utilize a RADIUS server 405 for certain authentication tasks as will be described below. The RADIUS server in turn uses the services of an authentication plug-in 407 to generate and authenticate responses to challenges. The RADIUS server may also uses the services of a directory service 409 and a Storage Name Service (iSNS) 411 in performing authentication tasks.

Figure 5:
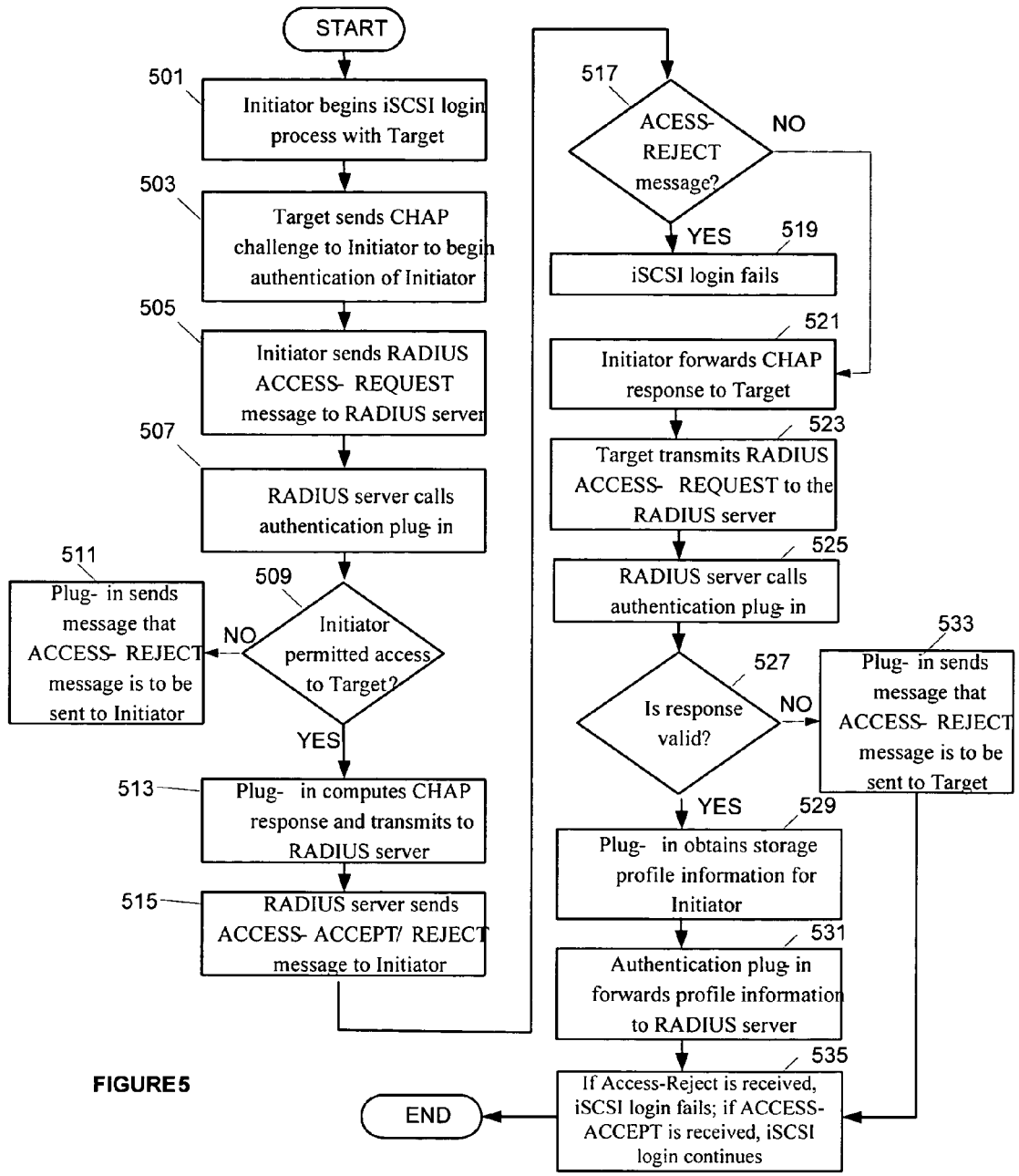
FIG. 5 is a flow chart illustrating a process of mutual authentication according to an embodiment of the invention.

A process according to an embodiment of the invention for performing mutual authentication within the environment 400 shown in FIG. 4 is described by way of the flow chart of FIG. 5. At step 501 of flow chart 500, the Initiator 401 begins the iSCSI login process with the Target 403. The Target 403 sends a CHAP challenge to the Initiator 401 to begin authentication of the Initiator 401 in step 503. At step 505, the Initiator sends a RADIUS ACCESS-REQUEST message with the Initiator 401 name, Initiator 401 message authenticator, Target 403 name, and the CHAP challenge to the RADIUS server 405.

At step 507, the RADIUS server 405 calls the authentication plug-in 407. In step 509, the authentication plug-in 407 verifies the identity of the Initiator 401 with respect to RADIUS and checks whether the Initiator 401 is permitted access to the Target (i.e., is permitted to know the shared secret). If not, at step 511 the plug-in sends a message that an ACCESS-REJECT message is to be sent to the Initiator 401, but if the Initiator 401 is permitted access to the Target, then at step 513, the plug-in 407 computes the appropriate CHAP response and transmits it to the RADIUS server 405 as an attribute for the RADIUS-ACCEPT message.

At step 515, the RADIUS server 405 sends the ACCESS-ACCEPT or ACCESS-REJECT message to the Initiator 401. At step 517, if the Initiator has received an ACCESS-REJECT message, then the iSCSI login fails at step 519 and the process ends. Otherwise, the Initiator forwards the CHAP response to the Target 403 in step 521.

At step 523, the Target 403 transmits a RADIUS ACCESS-REQUEST message with the Initiator 401 name, Target 403 name, CHAP challenge, and CHAP response (from Initiator 401) to the RADIUS server. This delegates the authentication of the Initiator 401 by the Target 403 to the RADIUS server. At step 525, the RADIUS server calls the authentication plug-in 407 with received information. In step 527, the authentication plug-in 407 authenticates the Initiator's response against the expected response based on the CHAP challenge and the Target 403 secret. If the response is valid, then at step 529 the authentication plug-in 407 obtains the storage profile information for the Initiator 401 on that Target 403. In step 531, the authentication plug-in 407 forwards the profile information to the RADIUS server 405 as a attributes for the RADIUS ACCESS-ACCEPT message. If the CHAP response is found not valid in step 527, then at step 533, the authentication plug-in 407 sends a message that ACCESS-REJECT should be sent to target. In step 535, the RADIUS server sends the ACCESS-ACCEPT/REJECT message to the Target 403. If the Target 403 receives an ACCESS-/REJECT message, then the iSCSI login fails. Otherwise, the iSCSI login process will continue with the authentication of Target 403 by the Initiator 401, which is symmetric to the case illustrated by FIG. 5. In particular, the Initiator 401 will now send the Target 403 a CHAP challenge, and the Target 403 will use the RADIUS server plug-in 407 to generate a CHAP response, and the Initiator 401 will use the plug-in 407 to verify the response.

Thus, using the response generation and verification plug-in to the RADIUS architecture, each machine only needs to know its own secret, and does not need to maintain a list of shared secrets with many different machines. This improves network efficiency and scalability.

As shown in FIG. 4, the environment of embodiments of the invention may include a Name Service database 411. The Name Service database 411 is used to determine information about the SAN such as what targets and initiators exist. In addition, the Name Service database 411 also further constrains the authentication process in an embodiment of the invention. In particular, for example, a SAN may be divided into "zones," with devices being authorized to communicate only to other devices within their zone. The Name Service database 411 can maintain this zone information, accessible to the RADIUS server 405, to deny access even when a peer is authorized to respond to a challenger. The Name Service may also contain the storage profile information.

As described above, embodiments of the invention operate in a computer environment comprising primarily servers. Computers such as servers typically include a variety of computer-readable media. Computer-readable media can be any available media that can be accessed by the computer and include both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, optical disk storage, magnetic cassettes, magnetic tape, magnetic disk storage or other magnetic storage devices, or any other medium which can be used to store the desired information and which can be accessed by the computer. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above are included within the scope of computer-readable media.

It will be appreciated that a new and useful system for network device authentication has been described. Although the description above focuses on the SAN as an example, it will be appreciated that the system described herein is useful anytime mutual authentication is needed in a network environment. Moreover, although a single authentication server has been described above, it will be appreciated that the invention applies equally to an environment having multiple such servers, where each device uses a different authentication server for generating and authenticating challenge responses. Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, patents and appendices, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Any recitation of ranges of values herein is merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. A method comprising:
receiving at a first device a challenge from a second device via a computer network when the first device attempts to log in to access the second device;
transmitting from the first device to an authentication server a first request to generate a response to the received challenge, the authentication server being configured to verify an identity of the first device with respect to the authentication server and determine whether the first device is permitted to access the second device, the authentication server being on a separate computing device from both the first device and the second device, the first request including a name of the first device, a message authenticator for the first device, a name of the second device, and the received challenge from the second device;
receiving at the first device from the authentication server a first reply to the first request, the first reply containing the response to the received challenge, the response comprising a first result of a computation on the challenge performed by the authentication server using a secret associated with the second device, wherein the secret is not transmitted between the first device and the authentication server during an authentication attempt, the secret being recognizable by the authentication server and not shared with potential peer devices including the first device; and
based on the first reply from the authentication server, terminating the authentication attempt at the first device or forwarding from the first device to the second device at least a portion of the first reply containing the response to the received challenge;

when the first device forwards the response to the second device, the second device is configured to:
  transmit to the authentication server a second request to validate the first device, the second request comprising at least the response, the challenge, the name of the first device, and the name of the second device;
  receive from the authentication server a second result of a computation on the response performed by the authentication server using the challenge and the secret associated with the second device; and
  based on the second result from the authentication server, terminate the authentication attempt at the second device or exchange data with the first device to continue the login process to enable the first device to authenticate the second device;
based on a successful validation of the first device:
  transmitting a second challenge from the first device to the second device for authentication of the second device by the first device, the second challenge transmitted to the second device to enable the second device to use the authentication server to generate a second response to the second challenge, the authentication server configured to generate the second response by using a first device secret that is associated with the first device and is not shared with the second device;
  receiving the second response to the second challenge from the second device;
  sending a third request including the second response to the authentication server to verify the second response, the authentication server configured to authenticate the second device against an expected response by using the first device secret associated with the first device;
  receiving at the first device a message from the authentication server indicating whether the second device has been authenticated.

2. The method according to claim 1, wherein transmitting from the first device to the authentication server the first request to generate the response to the received challenge comprises forwarding the challenge to the authentication server.

3. The method of claim 2, wherein the message authenticator is provided by the first device to authenticate the first device to the authentication server.

4. The method according to claim 1, further comprising prior to receiving at the first device the challenge from the second device, transmitting from the first device to the second device an access request.

5. The method of claim 1, wherein the first and second devices are data storage devices in a storage area network.

6. The method of claim 1, wherein the network comprises a storage area network, and receiving at the first device the challenge from the second device comprises receiving a Challenge Handshake Authentication Protocol (CHAP) challenge from the second device.

7. The method of claim 1, wherein terminating the authentication attempt at the first device or forwarding from the first device to the second device at least the portion of the first reply containing the response to the received challenge comprises forwarding from the first device to the second device the response if the first reply from the server includes the response to the received challenge, and otherwise terminating the authentication attempt at the first device.

8. The method of claim 1, wherein:
the first and second devices are data storage devices in a storage area network;
the authentication server is an access control server for the storage area network;
the authentication service is configured with an authentication plug-in; and
the first computation and second compilation are performed under control of the authentication plug-in.

9. A computer readable storage device having stored thereon computer-readable instructions that are executable, and responsive to executing the instructions, cause a first device to perform a method comprising:
receiving at the first device a challenge from a second device via a computer network;
transmitting from the first device to an authentication server a request to generate a response to the received challenge, the authentication server being on a separate computing device from the first device and the second device, the authentication server being configured to verify an identity of the first device and determine whether the first device is permitted to access the second device, the request including a name of the first device, a message authenticator for the first device, a name of the second device, and the received challenge from the second device;
receiving at the first device from the authentication server a reply to the request, the reply containing the response to the received challenge, the response comprising a result of a computation performed by the authentication server using a secret associated with the second device, the secret being recognizable by the authentication server and not shared with potential peer devices including the first device, wherein the secret is not transmitted between the first device and the authentication server during an authentication attempt;
based on the reply from the authentication server, terminating the authentication attempt at the first device or forwarding from the first device to the second device at least a portion of the reply containing the response to the received challenge to enable the second device to verify the response to the received challenge by using the authentication server to validate the first device and return a result of a computation on the response, the computation utilizing the challenge and the secret; and
based on a successful validation of the response to the challenge, initiating another authentication sequence effective to authenticate the second device to the first device by at least utilizing the authentication server.

10. The computer readable storage device according to claim 9, wherein the instructions for transmitting from the first device to the authentication server the request to generate the response to the received challenge comprise instructions for forwarding the challenge to the authentication server.

11. The computer readable storage device of claim 10 further comprising instructions for providing authentication information to authenticate the first device to the authentication server.

12. The computer readable storage device according to claim 9, the instructions further comprising instructions for transmitting from the first device to the second device an access request prior to receiving at the first device the challenge from the second device.

13. The computer readable storage device of claim 9, wherein the first and second devices comprise data storage devices in a storage area network.

14. The computer readable storage device of claim 9, wherein the network comprises a storage area network, and the instructions for receiving at the first device the challenge from the second device comprise instructions for receiving a Challenge Handshake Authentication Protocol (CHAP) challenge from the second device.

15. The computer readable storage device of claim 9, wherein the instructions for terminating the authentication attempt at the first device or forwarding from the first device to the second device at least the portion of the reply containing the response to the received challenge comprise instructions for forwarding from the first device to the second device the response to the second device if the reply from the server includes the response to the received challenge, and otherwise terminating the authentication attempt at the first device.

16. A method implemented by an authentication server device, the method comprising:

receiving a first request at an authentication server from an initiator device via a network, the first request including at least a challenge issued by a target device when the initiator device attempts to login to access the target device, the first request further including a name of the initiator device, a message authenticator of the initiator device, and a name of the target device;

verifying an identity of the initiator device with respect to the authentication server;

determining that the initiator device is permitted to access the target device;

generating a response packet to the challenge from the target device by using a secret associated with the target device, each of the initiator and target devices maintaining a respective secret that is recognizable by the authentication server device and not shared with other potential peer devices;

transmitting, to the initiator device, the response packet to the challenge having an attribute to indicate that the initiator device is permitted to access the target device, the initiator device configured to forward the response packet to the target device for authentication of the initiator device by the target device;

receiving from the target device a second request that includes at least the challenge, the name of the initiator device, the name of the target device, and the response packet to the challenge, the second request delegating authentication of the initiator device by the target device to the authentication server;

authenticating the response packet against an expected response that is based on the challenge and the secret associated with the target device;

based on a valid authentication of the response packet, obtaining storage profile information associated with the initiator device and the target device; and transmitting, to the target device, the storage profile information to enable the target device to continue the login process by exchanging data with the initiator device to enable the initiator device to authenticate the target device.

17. The method of claim 16, further comprising:

receiving a third request at the authentication server from the target device requesting generation of a second response packet to a second challenge issued by the initiator device for authentication of the target device;

generating the second response packet to the second challenge by using a secret associated with the initiator device;

transmitting the second response packet to the second challenge to enable the target device to forward the second response packet to the initiator device;

receiving from the initiator device a fourth request including at least the second challenge and the second response packet to the second challenge, the fourth request delegating the authentication of the target device by the initiator device to the authentication server;

verifying the second response packet against a second expected response based on the second challenge and the secret associated with the initiator device;

based on the second response packet being validated, transmitting a reply to the fourth request to the initiator device to indicate that the target device has been authenticated.

18. The method of claim 16, wherein the challenge is a Challenge Handshake Authentication Protocol (CHAP) challenge, and wherein the authentication server device is a Remote Authentication Dial-In User Service (RADIUS) server.

19. The method of claim 16, wherein the initiating device and the target device each comprise a data storage device in a storage area network.

* * * * *